PROGRAMED SUPERCONDUCTOR RING COMMUTATOR

Filed Dec. 29, 1958 3 Sheets-Sheet 1

INVENTOR
DAVID J. DUMIN
BY John E. Dougherty Jr.
ATTORNEY

Sept. 26, 1961 D. J. DUMIN 3,002,111

PROGRAMED SUPERCONDUCTOR RING COMMUTATOR

Filed Dec. 29, 1958 3 Sheets-Sheet 3

United States Patent Office 3,002,111

Patented Sept. 26, 1961

3,002,111

PROGRAMED SUPERCONDUCTOR RING COMMUTATOR

David J. Dumin, Poughkeepsie, N.Y., assignor to International Business Machines Corporation, New York, N.Y., a corporation of New York

Filed Dec. 29, 1958, Ser. No. 783,480

15 Claims. (Cl. 307—88.5)

The present invention relates to superconductor circuitry and, more particularly, to superconductor circuitry which is operable as a ring or commutator, as well as to programmable superconductor circuitry of this and similar types.

Ring and commutator circuits may be generally described as circuits which are operated to produce a series of sequential output signals either at a single output for the circuit or at a plurality of outputs for the circuit. Though superconductor circuits have been produced to perform the function of a ring circuit wherein a series of shift pulses is applied to produce the sequential outputs, prior to the subject invention, there has not been available a superconductor ring or commutator of the free running type, that is, a circuit that is capable of producing in a predetermined sequence a plurality of outputs having distinct characteristics. Further, in the design of a complete superconductor computer there has arisen the need for programmable circuits of this and other types which are necessary to achieve the flexibility of operation required of present day computers.

Accordingly, the subject invention, as is demonstrated by one of the embodiments disclosed herein by way of example, provides a commutator ring which includes a plurality of superconductor bistable circuits, each of which forms one stage of the ring and is capable of assuming an On and Off state. Each stage of this ring is coupled to the next stage and is effective, when it is turned On, to turn On the succeeding stage so that once the first stage of the ring is turned On, the other stages of the ring are successively turned On to produce a series of sequential outputs. Each of the stages is also coupled to the second stage preceding it in the ring in such a way that as each succeeding stage is turned On it, in turn, turns Off the second stage preceding it in the ring. In this way, the duration of the outputs produced by the ring circuit is precisely defined. In accordance with a further embodiment of the invention, a circuit of the above described type is provided wherein the coupling between the stages is in the form of a program circuit which is controllable to selectively render each of the stages responsive to change states under the control of any one of a number of other stages in the ring. By properly programming this circuit any one of a number of combinations of sequential outputs having any one of a number of different characteristics may be obtained.

Therefore, it is an object of the present invention to provide improved superconductor circuits of the ring and/or commutator types.

Another and equally important object is to provide programmable superconductor circuits.

Still another object is to provide a superconductor circuit including a plurality of superconductor bistable devices wherein the devices are coupled by circuitry which is programmable to control the response of the devices one to the other.

A further object is to provide a programmable commutator ring which is capable of producing a series of sequential outputs having any one of a number of different characteristics.

Still a further object is to provide superconductor circuitry using a plurality of bistable stages with connections coupling these stages which may be controlled to render each of a number of the stages in the circuit selectively responsive to any one of a plurality of the other stages in the circuit.

A further object is to provide circuits of the above described type using superconductor devices which are capable of assuming two different stable states and which are completely superconductive when in either of these stable states.

These and other objects of the invention will be pointed out in the following description and claims and illustrated in the accompanying drawings, which disclose, by way of example, the principle of the invention and the best mode, which has been contemplated, of applying that principle.

Figures 1, 2:
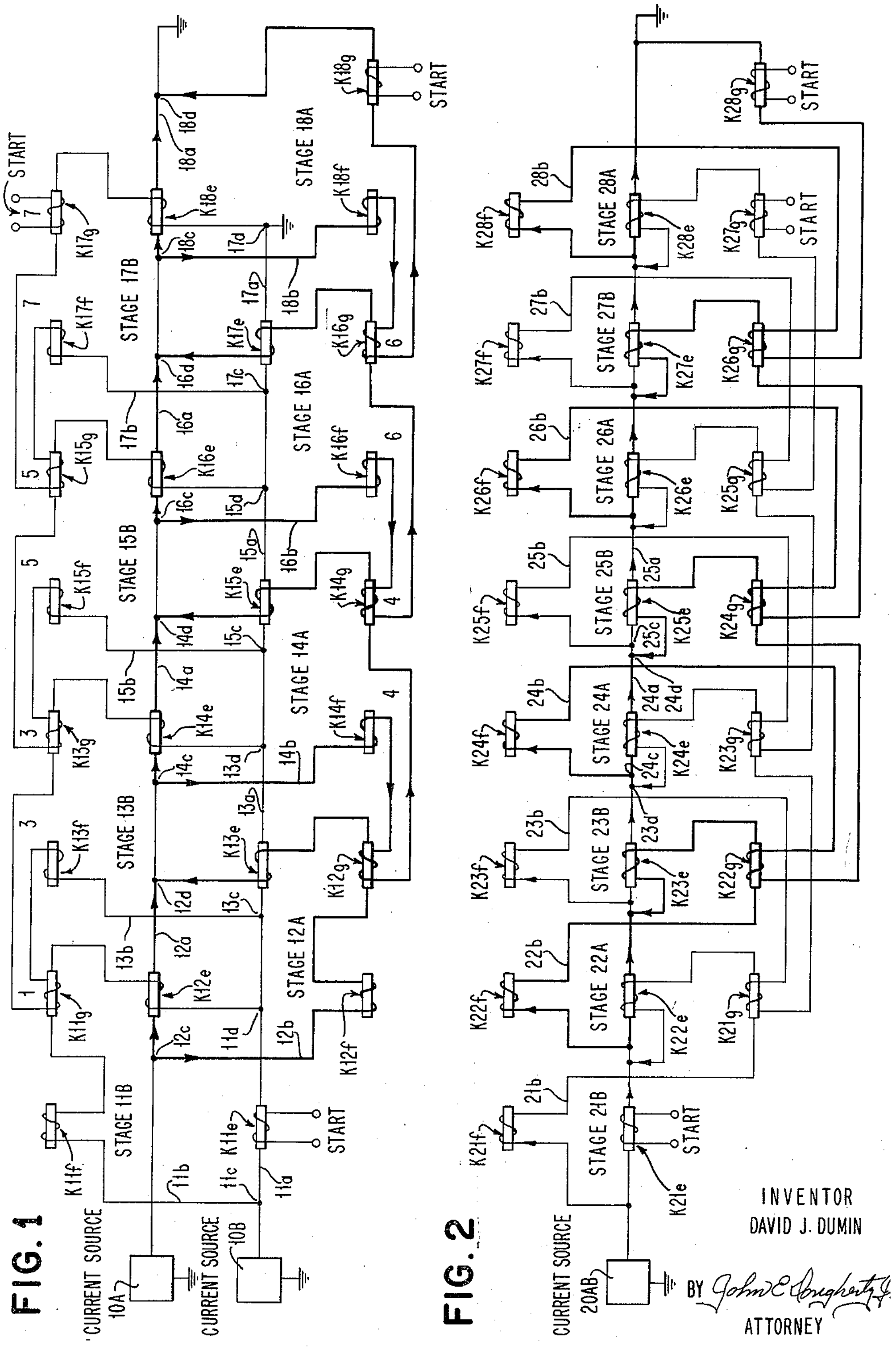
FIG. 1 is a schematic representation of a ring circuit constructed in accordance with the principles of the invention.
FIG. 2 is a further embodiment of a ring circuit which is constructed in accordance with the principles of the invention and which differs from the embodiment of FIG. 1 in that the entire supply current is supplied by a single current source.

The ring circuit shown in FIG. 1 comprises a first group of parallel circuits connected in series with a current source 10A and a second group of parallel circuits connected in series with a current source 10B. In order to provide a clearer illustration and facilitate the explanation, each of the parallel circuits in the group which is series connected with source 10A is shown in heavy lines. There are four such circuits connected in series with source 10A each of which represents one stage of the ring circuit and these stages are designated 12A, 14A, 16A and 18A. There are also four stages designated 11B, 13B, 15B and 17B connected in series with source 10B. Each of these stages is similarly constructed and, considering stage 14A as an example, includes two paths **14*a* and 14*b* extending in parallel between a pair of terminals 14*c* and 14*d*. Path 14*a* includes a gate of cryotron K14*e*. Path 14*b* includes a control coil for an output cryotron K14*f* for stage 14A, a control coil for a cryotron K12*g* which has its gate connected in path 12*b* of the preceding stage 12A, a gate of cryotron K14*g*, and a control coil of a cryotron K15*e* connected in path 15*a* of stage 15B. Each of the other stages of the ring are constructed in the same way as stage 14A, with the exception that the first two stages 11B and 12A do not include counterparts of the control coil for cryotron K14*g* which is connected in path 14*b* of stage 14A. For obvious reasons, character designations similar to those used for stage 14A** are employed to identify the various components of the other stages. Before undertaking the explanation of the operation of the ring circuit as a whole, a discussion of the manner in which the circuit may be constructed as well as to the function of the various cryotrons associated with one stage is considered advisable.

Each of the cryotron gates in the ring circuit is constructed of a material which is in a superconductive state at the operating temperature of the circuit in the absence of a magnetic field, but which is driven resistive by the magnetic field produced when a current greater than a predetermined minimum or threshold current is caused to flow in its control conductor. The remaining portions of the circuit, that is the cryotron control conductors and the connections between the various cryotron components are fabricated of a superconductor material which remains in a superconductive state under all conditions of circuit operation. It should be noted at this point that, though the cryotrons are shown in the drawings to be of the wire wound type since it is believed that this type of representation provides a more graphic illustration, film type cryotrons may also be employed in circuits constructed and operated in accordance with the principles of the subject invention. For detailed discussions of film type cryotrons and the manner in which they may be constructed, reference may be made to copending applications Serial No. 625,512 and Serial No. 765,760 filed respectively on November 30, 1956 and October 7, 1958, both of which have been assigned to the assignee of the subject invention.

Referring again to the stage 14A as an example, it can be seen that this stage has connected in its parallel paths one of the components, that is either the control conductor or gate conductor, of five different cryotrons, specifically, cryotrons K14*e*, K14*f*, K12*g*, K14*g* and K15*e*. The gates of cryotrons K14*e* and K14*g*, which are connected respectively in paths 14*a* and 14*b*, are employed to control the distribution of current from source 10A between these paths. Each of the stages of the ring circuit may be considered as a bistable circuit having an On and an Off state. Thus, stage 14A is in its Off state when the current from source 10A is directed through path 14*a* and is in its On state when this current is directed through path 14*b*. Once the current has been caused to flow in either of these paths by driving the gate of cryotron K14*e* or K14*g* resistive, the circuit remains stable in this state after the resistive gate is again allowed to become superconductive, until the other gate is driven resistive. The control coil for cryotron K14*e* is connected in path 13*b* of the preceding B stage 13B so that, if we consider stage 14A to be normally in its Off state with current in path 14*a*, this stage is switched to its On state when the preceding B stage 13B is switched from its Off to its On stage. The control coil for cryotron K14*g* is connected in path 16*b* of the succeeding A stage 16A, which is separated from stage 14A by stage 15B, so that if stage 14A is in its On state with current in path 14*b*, it will be switched to its Off state when stage 16B is caused to assume its On state. Thus, it can be seen that when stage 13B is switched to its On state, it, in turn, switches stage 14A On, and when stage 16A is switched to its On state, it, in turn, switches stage 14A to its Off state.

The output for stage 14A is taken by way of cryotron K14*f*, which has its control coil connected in path 14*b* of this stage so that it is superconductive when the stage is Off and resistive when the stage is On.

The remaining two cryotron components connected in stage 14A, that is the control coils for cryotrons K12*g* and K15*e*, serve to control the switching of stages 12A and 15B, respectively. The gate of cryotron K12*g* is connected in path 12*b* of stage 12A and the gate of cryotron K15*e* is connected in path 15*a*; stage 14A is effective when switched to its On state to switch 12A to its Off state and stage 15B to its On state.

From the above description it can be seen that the ring circuit shown actually consists of eight successive stages, and that each stage, with the exception of the last stage 18A, is effective when turned On to turn On the next succeeding stage, and each stage, with the exception of the first two stages 11B and 12A, is effective when turned On to turn Off the second preceding stage in the ring. Actually, when any one of these stages is switched from one of its stable states to the other, it takes a finite time, the duration of which depends upon the $L/R$ time constant of the circuit, to switch the current from one of its paths to the other and this switching time is here advantageously employed to produce the sequential outputs required of a ring circuit.

Figure 1A:
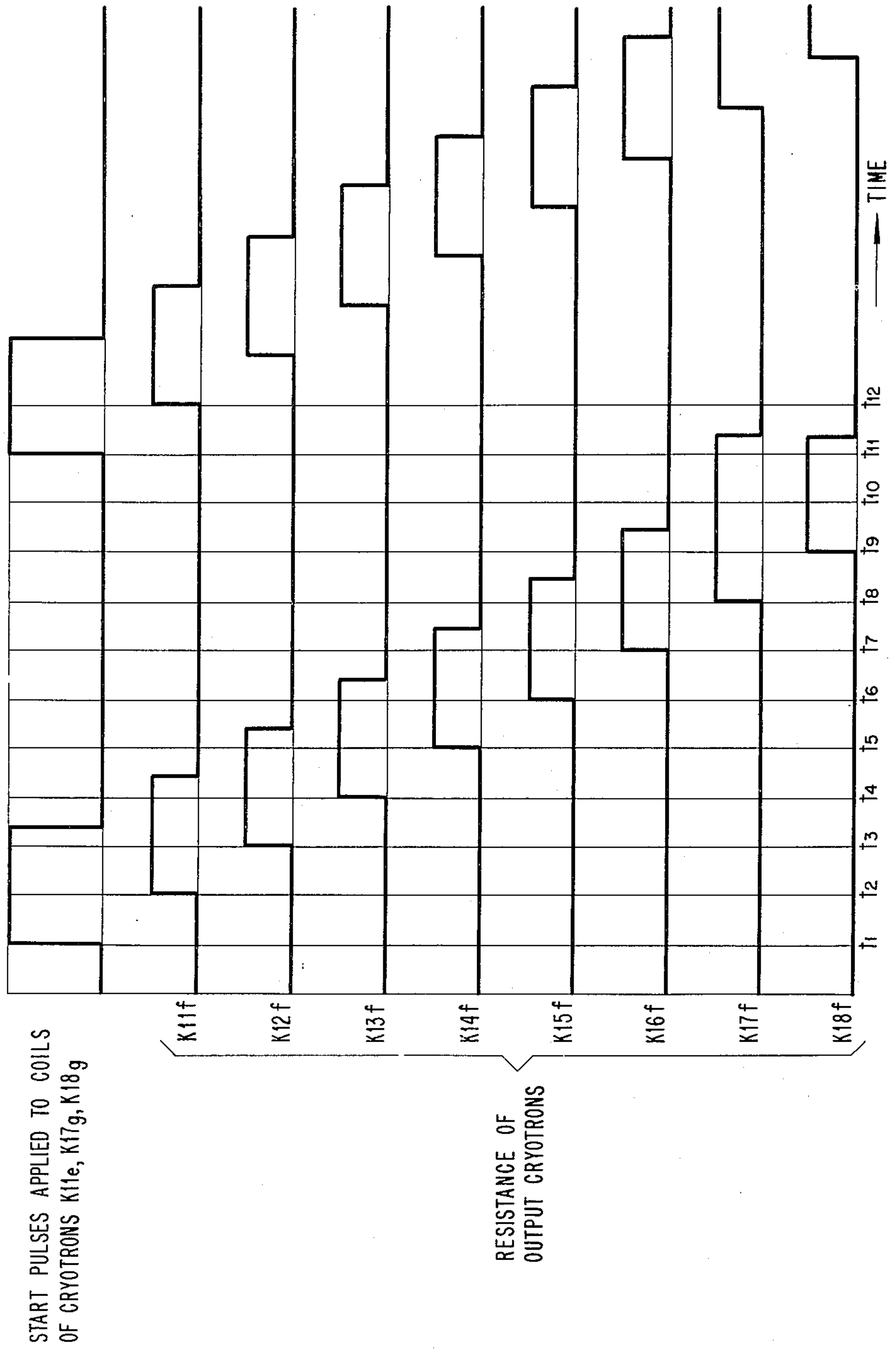
FIG. 1A is a diagram of the inputs and outputs for the circuit of FIG. 1.

The operation of the ring circuit as a whole will now be described with reference to the pulse diagram of FIG. 1A. For this description it is assumed that each of the eight stages of the ring circuit is initially in its Off state and each of the output cryotrons K11*f*, K12*f*, K13*f*, K14*f*, K15*f*, K16*f*, K17*f* and K18*f* is, therefore, in a superconductive state so that, as indicated in FIG. 1A, the gates of these cryotrons initially exhibit essentially zero resistance. At a time $t_1$ a start pulse is applied to the coils of cryotrons K11*e*, K17*g* and K18*g*, thereby causing the gates of these cryotrons to be driven resistive. The gate of cryotron K17*g* is connected in path 17*b* of stage 17B and the gate of cryotron K18*g* is connected in path 18*b* of stage 18A. Since, for this description, each of these stages is initially assumed to be in its Off state, the current in stage 17B is in path 17*a*, and in stage 18A is in path 18*a* and switching of the gates of cryotrons K17*g* and K18*g*, therefore, has no effect. However, the switching of the gate of cryotron K11*e* to a resistive state causes the current from source 10B in stage 11B to begin to shift from path 11*a* to 11*b*, that is the switching of this stage from its Off to its On state is initiated. The current shifting in stage 11B continues until this stage is switched completely to its On state, and, at a time $t_2$ during this current shifting operation, there is sufficient current in the coils of cryotrons K11*f* and K12*e*, which are connected in path 11*b*, to drive the gates of these cryotrons resistive. Thus, at time $t_2$ the gate of cryotron K11*f* is driven resistive to manifest the first output for the ring circuit and the gate of cryotron K12*e*, which is connected in path 12*a* of stage 12B, is driven resistive to initiate the switching of this stage from its Off to its On state. At a time $t_3$ during this switching of stage 12A, the gate of the output cryotron K12*f* for this stage is driven resistive to provide the second of the series of sequential outputs for the ring circuit, and the gate of cryotron K13*e* is driven resistive to initiate the switching of stage 13B from its Off to its On state. At $t_4$ during this switching of stage 13B, cryotrons K13*f* and K14*e* are switched to provide the third output of the ring circuit and to initiate switching of the fourth stage 14A. At the same time, that is at $t_4$ time, the gate of cryotron K11*g*, which has its control coil in path 13*b* of stage 13B is driven resistive to initiate the resetting of stage 11B back to its Off state. Shortly after time $t_4$ enough current has been shifted out of path 11*b* to allow the gates of cryotrons K11*f* and K12*e* to again assume a superconductive state. When the gate of cryotron K11*f* goes superconductive, the first of the sequential outputs is terminated. The switching of the gate of cryotron K12*e* to a superconductive state does not affect stage 12A since, at this time, this stage is in its On condition with the current from source 10A in the completely superconductive path 12*b*.

At time $t_5$ the operation is similar to that occurring at time $t_4$ since, at time $t_5$, sufficient current has been shifted in the fourth stage 14A from path 14*a* to 14*b* to cause the gates of cryotrons K14*f*, K12*g* and K15*e* to be driven resistive. With the gate of cryotron K14*f* driven resistive the fourth output for the ring circuit is produced; the driving of the gate of cryotron K12*g* resistive initiates the switching of stage 12A from its On to its Off state so that the second ring circuit output which is manifested by output cryotron K12*f* is terminated shortly after time $t_5$; and the driving of the gate of cryotron K15*e* resistive initiates the switching of stage 15B from its Off to its On state.

Similar operations are repeated during the succeeding time intervals so that the stages of the ring circuit are successively turned On to produce the series of sequential outputs required of the ring circuit. The outputs produced by the last two stages of the ring circuit, as manifested by cryotrons K17*f* and K18*f*, are not terminated until the next start pulse is applied. These last two stages may be utilized as output stages or may be merely terminating stages which are provided to reset stages 15B and 16A and thereby terminate the outputs produced by these stages in the same manner as the outputs are terminated for the first four stages.

As shown in FIG. 1A, a second start pulse is applied to the ring circuit at a time $t_{11}$. This start pulse drives the gates of cryotrons K17*g* and K18*g* resistive to cause the last two stages of the ring circuit to be turned Off, and also drives the gate of cryotron K11*e* of the first stage resistive so that the switching of this stage from its Off to its On state is initiated. Thereafter, the operation is the same as explained above with each of the stages of the ring circuit being successively turned On under the control of the preceding stage and then being turned Off under the control of the second stage succeeding it in the ring circuit. Of course, a closed ring circuit may be provided by connecting the coil of cryotron K11*e* in the path 18*b* so that the first stage is turned On under the control of the last stage; and by connecting the control coils of cryotrons K17*f* and K17*g* respectively in the paths K11*b* and K12*b* of stages 11B and 12A so that the stages 17B and 18A are turned Off under the control of the stages 11B and 12A, respectively. In ring circuits of this type as well as the open type shown in the drawing, it may, in many cases, be advisable to provide a reset cryotron in the "*b*" paths of each stage (e.g. path 14*b*) so that the ring circuit may be initially reset by a single pulse which is effective to turn all of the stages Off. Thereafter, a single start pulse may be applied to a cryotron in path 11*a* of the first stage to initiate the production of the desired series of outputs.

The ring circuit of FIG. 2 is constructed in the same manner as that of FIG. 1 with the single exception that the eight stages of the circuit of FIG. 2 are connected in series with a single current source 20AB rather than using two sources connected in series with alternate stages as in FIG. 1. The character designations used in FIG. 2 correspond to those used in FIG. 1 with the change that, in FIG. 2, numerals in the series from 20 to 28 are employed instead of in the series from 10 to 18 as in FIG. 1. Thus, the eight stages of FIG. 2 are designated 21B, 22A, 23B, 24A, 25B, 26A, 27B and 28A. Further, as in FIG. 1, the alternate stages 22A, 24A, 26A and 28A are shown in heavy lines in order to provide a clearer illustration of the circuit. The construction of the stages and the mode of operation is the same for the single source embodiment of FIG. 2 as for the double source embodiment of FIG. 1. This can be illustrated by examining a single stage of the ring circuit of FIG. 2 and stage 24A will be considered for this purpose. This stage includes two parallel current paths 24*a* and 24*b*. Path 24*a* includes the gate of a cryotron K24*e* which has its control coil connected in path 23*b* of the previous stage so that stage 24A is turned from its Off to its On condition in response to a similar switching of stage 23B. The other path 24*b* of stage 24A includes the control coil of an output cryotron K24*f*; the control coil of a cryotron K22*g* which has its gate connected in path 22*b* of stage 22A so that stage 22A is reset to its Off condition when stage 24A is switched On; the gate of a cryotron K24*g* which has its control coil connected in path 26*b* of stage 26A so that stage 24A is reset to its Off condition when stage 26 is switched On; and the control coil of a cryotron K25*e* which has its gate connected in path 25*a* of stage 25B so that this stage is switched On when stage 24A is switched On. The difference in the connections between the stages is illustrated by the fact that the current input terminal 24*c* of stage 24A is connected to the current output terminal 23*d* of the immediately preceding stage 23B and the current output terminal 24*d* of stage 24A is connected directly to the current input terminal 25*c* of the next succeeding stage 25B of the ring circuit.

Figure 3:
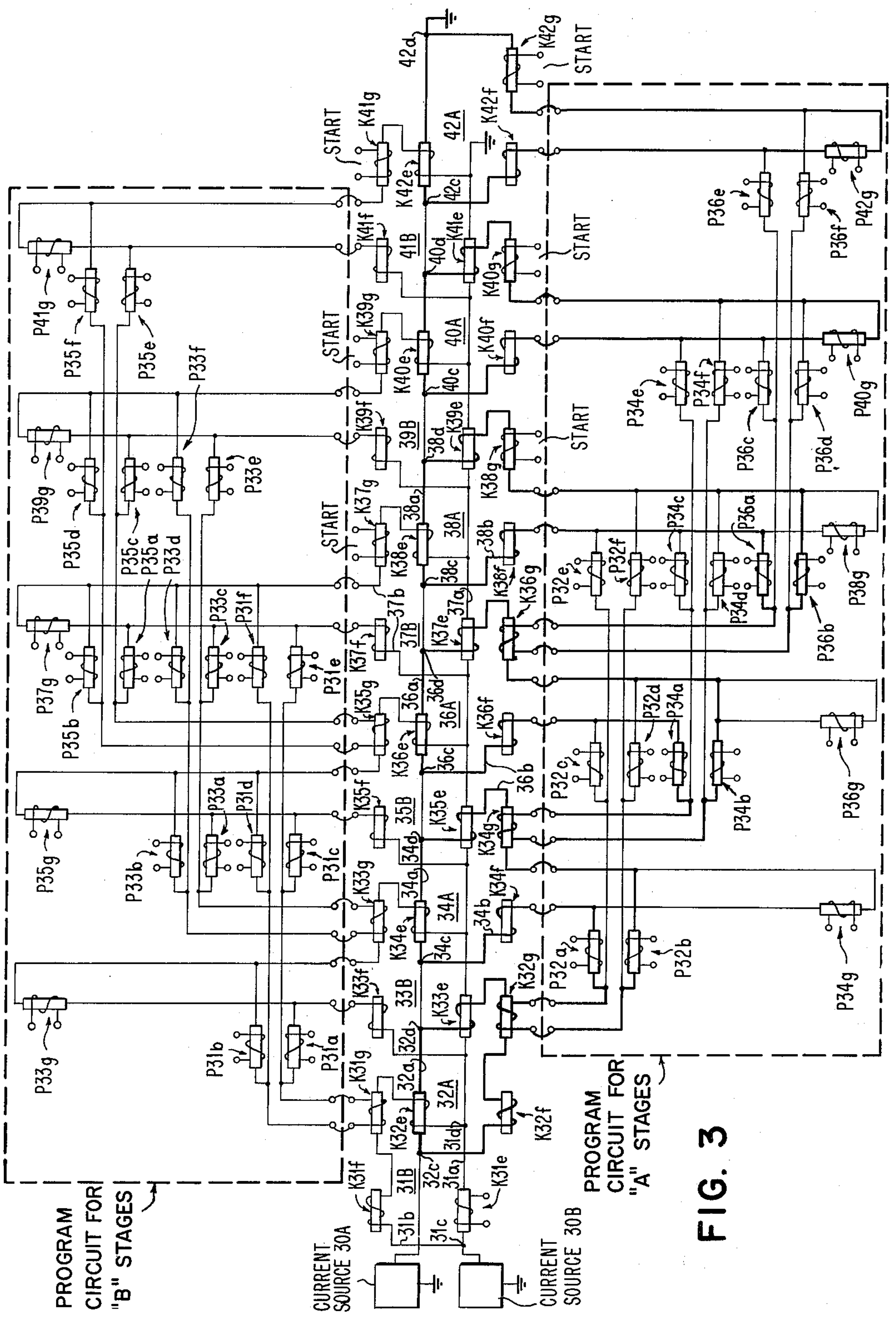
FIG. 3 is a schematic representation of an embodiment of a programmable ring circuit, which demonstrates the manner in which programmable circuits, constructed in accordance with the principles of the invention, may be advantageously employed in computer circuits.

The programmable commutator ring of FIG. 3 is similar in its basic aspects to the circuit of FIG. 1, differing primarily in that the circuit of FIG. 3 can be programmed to control the duration of the output signals. For this reason, the character designations of FIG. 3 are similar to those in FIG. 1 differing in that the number series used in FIG. 3 begins at 30. Thus, in FIG. 3 there are two current sources 30A and 30B (which correspond to sources 10A and 10B of FIG. 1). There are connected in series with current source 30A six stages, (rather than four as in FIG. 1), which are designated 32A, 34A, 36A, 38A, 40A and 42A. Similarly six stages 31B, 33B, 35B, 37B, 39B, and 41B are series connected with source 30B.

The circuit of FIG. 3 is shown divided into three sections. The top and bottom sections, as indicated by the dotted blocks, include the program circuits for the "B" and "A" stages of the ring circuit. The ring circuit itself, exclusive of this program control circuitry which is employed to control the termination of the output signals, is shown in the center of the circuit diagram. As in the previous diagrams the "A" stages of the ring circuit are shown in heavy lines. Further, that portion of the program control circuit for the "A" stages which may be rendered effective by the application of proper program control inputs to produce outputs in the same way as the circuit of FIG. 1, is also shown in heavy lines. In the ring circuit of FIG. 1, each stage is turned from its Off to its On state under the control of the stage preceding it in the ring, and each stage is subsequently reset from its On to its Off state under control of the second succeeding stage in the ring. Each of the gates of the cryotrons in the program circuits for controlling the "A" and "B" stages of the ring circuit of FIG. 3 is superconductive at the operating temperature of the circuit, and programming of the circuit to provide any desired one of a number of different type ring circuit outputs is accomplished by selectively energizing the control coils for these cryotrons in predetermined combinations. In order to program the ring circuit to operate in the same manner as the ring circuit of FIG. 1, the program control cryotrons are energized so that certain ones thereof are driven resistive and others allowed to remain superconductive as indicated in the table below which also indicates the manner in which each of the stages of the ring is initially switched On to produce an output and then subsequently reset to its Off condition to cause the output to be terminated.

*Table I*

| Gates of Program Control Cryotrons | | Control of Stages | | |
|---|---|---|---|---|
| Super-conductive | Resistive | Stage | Turned On by— | Turned Off by— |
| P32*a*<br>P32*b* | P32*c*<br>P32*d*<br>P32*e*<br>P32*f* | 31B | start pulse | 33B |
| | | 32A | 31B | 34A |
| | | 33B | 32A | 35B |
| P34*a*<br>P34*b* | P34*c*<br>P34*d*<br>P34*e*<br>P34*f*<br>P34*g* | 34A | 33B | 36A |
| | | 35B | 34A | 37B |
| | | 36A | 35B | 38A |
| P36*a*<br>P36*b* | P36*c*<br>P36*d*<br>P36*e*<br>P36*f*<br>P36*g* | 37B | 36A | start pulse |
| | | 38A | 37B | start pulse |
| | | 39B | 38A | start pulse |
| P40*g*<br>P42*g* | P38*g* | 40A | 39B | start pulse |
| | | 41B | 40A | start pulse |
| P31*a*<br>P31*b* | P31*c*<br>P31*d*<br>P31*e*<br>P31*f* | 42A | 41B | start pulse |
| P33*a*<br>P33*b* | P33*c*<br>P33*d*<br>P33*e*<br>P33*f*<br>P33*g* | | | |
| P35*a*<br>P35*b* | P35*c*<br>P35*d*<br>P35*e*<br>P35*f*<br>P35*g* | | | |
| P39*g*<br>P41*g* | P37*g* | | | |

From examination of the right hand position of the table, it can be seen that each stage is turned On by the preceding stage and is reset by the second succeeding stage in the ring so that stages 31B, 32A, 33B, 34A, 35B and 36A produce outputs such as are indicated in FIG. 1A for stages 11B through 16B of FIG. 1. The other six stages, that is, stages 37B through 42A, are terminating stages and are sequentially turned On in the proper order when a start pulse is applied and remain On until the application of the next start pulse. Six terminating stages are required in the programmable ring of FIG. 3 since, as will be later explained in detail, the circuit may be programmed so that each stage is reset to its Off when, as above, the second succeeding stage in the ring is turned On, or when the fourth or sixth succeeding stage in the ring is turned On.

The manner in which each of the stages is switched between Off and On states under the control of the program circuits may be illustrated by a detailed consideration of stage 38A. This stage includes two parallel paths **38*a* and 38*b* extending between a pair of terminals 38*c* and 38*d*. As in the embodiments of FIGS. 1 and 2, each of the stages is considered to be Off when the current applied to its input terminal (e.g. 38*c***) is in its "*a*" path (e.g. **38*a***); and to be in its On state when the applied current is in its "*b*" path (e.g. **38*b*). Path 38*a* of stage 38A includes the gate of cryotron K38*e*, which has its control coil connected in path 37*b* of the preceding stage 37B in the ring. Thus, stage 38A is switched On in response to the turning of stage 37B On. The other path 38*b* extends from terminal 36*e* through the control coil of the output cryotron K38*f* for stage 38A. For the program control inputs specified in Table I above for which the gates of cryotrons P36*a* and P36*b* are superconductive and the gates of cryotrons P32*e*, P32*f*, P34*c* and P34*d* are resistive, current in path 38*b*, as indicated by the heavy lines, is directed from the coil of cryotron K38*f* through the gate of cryotron P36*a* to and through the control coil of cryotron K36*g*, which has its gate connected in path 36*b* of stage 36A, and thence back through the gate of cryotron P36*b*, the gate of cryotron K38*g*, and the control coil of cryotron K39*e*, which is connected in the path 39*a* of stage 39B, to the current output terminal 38*d* for stage 38A. As can be seen from an examination of FIG. 3, the gate of cryotron P36*a* is connected in parallel with the gates of cryotrons P32*e*, P34*c* and P38*g*. However, since these latter three cryotrons are resistive for the program under consideration and the gate of cryotron P36*a* is superconductive, any current established in path 36*b* is directed entirely through the gate of cryotron P36*b* to the control coil of cryotron K36*g* so that, when stage 38A is turned On, the second preceding stage 36A** in the ring is turned Off. For the program under consideration, there is a similar path established in the program circuit from the "*b*" path (e.g. **38*b***) of each of the stages of the ring (excluding the first two stages) to the control coil of the "*g*" cryotron (e.g. K**36*g***) of the second preceding stage. Thus, when a start pulse is applied to the ring circuit, with the control coils of the program control cryotron energized in accordance with Table I, the "*f*" cryotron for the successive stages beginning with the first (K**31*f***) are successively driven resistive and remain resistive until the second succeeding stage in the ring is turned On so that output pulses such as are shown in FIG. 1A are produced.

As noted above the circuit may be programmed so that each stage remains On until either the fourth or sixth succeeding stage in the ring is turned On. The program control set ups required to obtain this type of operation are shown in Tables II and III below. Table II illustrates the programming when each stage is to be reset by the fourth succeeding stage of the ring, and Table III illustrates the programming when each stage is to be reset by the sixth succeeding stage of the ring.

*Table II*

| Gates of Program Control Cryotrons | | Control of Stages | | |
|---|---|---|---|---|
| Super-conductive | Resistive | Stage | Turned On by— | Turned Off by— |
| P32*c* | P32*a* | 31B | start pulse | 35B |
| P32*d* | P32*b* | | | |
| | P32*e* | 32A | 31B | 36A |
| | P32*f* | | | |
| | | 33B | 32A | 37B |
| P34*c* | P34*a* | | | |
| P34*d* | P34*b* | 34A | 33B | 38A |
| P34*g* | P34*e* | | | |
| | P34*f* | 35B | 34A | 39B |
| P36*c* | P36*a* | 36A | 35B | 40A |
| P36*d* | P36*b* | | | |
| | P36*e* | 37B | 36A | start pulse |
| | P36*f* | | | |
| | P36*g* | 38A | 37B | start pulse |
| P42*g* | P38*g* | 39B | 38A | start pulse |
| | P40*g* | | | |
| | | 40A | 39B | start pulse |
| P31*c* | P31*a* | | | |
| P31*d* | P31*b* | 41B | 40A | start pulse |
| | P31*e* | | | |
| | P31*f* | 42A | 41B | start pulse |
| P33*c* | P33*a* | | | |
| P33*d* | P33*b* | | | |
| P33*g* | P33*e* | | | |
| | P33*f* | | | |
| P35*c* | P35*a* | | | |
| P35*d* | P35*b* | | | |
| | P35*e* | | | |
| | P35*f* | | | |
| | P35*g* | | | |
| P41*g* | P37*g* | | | |
| | P39*g* | | | |

*Table III*

| Gates of Program Control Cryotrons | | Control of Stages | | |
|---|---|---|---|---|
| Super-conductive | Resistive | Stage | Turned On by— | Turned Off by— |
| P32*e* | P32*a* | 31B | start pulse | 37B |
| P32*f* | P32*b* | | | |
| | P32*c* | 32A | 31B | 38A |
| | P32*d* | | | |
| | | 33B | 32A | 39B |
| P34*e* | P34*a* | | | |
| P34*f* | P34*b* | 34A | 33B | 40A |
| P34*g* | P34*c* | | | |
| | P34*d* | 35B | 34A | 41B |
| P36*e* | P36*a* | 36A | 35B | 42A |
| P36*f* | P36*b* | | | |
| P36*g* | P36*c* | 37B | 36A | start pulse |
| | P36*d* | | | |
| | | 38A | 37B | start pulse |
| | P38*g* | | | |
| | P40*g* | 39B | 38A | start pulse |
| | P42*g* | | | |
| | | 40A | 39B | start pulse |
| P31*e* | P31*a* | | | |
| P31*f* | P31*b* | 41B | 40A | start pulse |
| | P31*c* | | | |
| | P31*d* | 42A | 41B | start pulse |
| P33*e* | P33*a* | | | |
| P33*f* | P33*b* | | | |
| P33*g* | P33*c* | | | |
| | P33*d* | | | |
| P35*e* | P35*a* | | | |
| P35*f* | P35*b* | | | |
| P35*g* | P35*c* | | | |
| | P35*d* | | | |
| | P37*g* | | | |
| | P39*g* | | | |
| | P41*g* | | | |

Again considering stage 38A as an example and specifically the operation of this stage when the circuit is programmed as indicated in Table II, it can be seen that, with the gates of cryotrons P**32*e*, P36*a* and P38*g* resistive and the gate of cryotron P34*c* superconductive, current in path 38*b* of this stage is now directed through the gate of cryotron P34*c* to and through the control coil of cryotron K34*g* and thence back through the superconductive gate of cryotron P34*d*. The gate of cryotron K34*g* is connected in path 34*b* of stage 34A and it, therefore, becomes apparent that stage 34A is turned Off to terminate its output when the fourth succeeding stage 38A** is turned On. A similar circuit is available to reset each of the first six stages of the ring. Since each stage is still initially turned On under the control of the stage immediately preceding it, the ring circuit, when programmed in accordance with Table II, produces a series of successive outputs which are initiated in the same time sequence as the outputs shown in FIG. 1A, but which are each maintained for essentially twice the time interval as the outputs shown in FIG. 1A.

When the circuit of FIG. 3 is programmed in accordance with Table III, the series of outputs developed are again initiated in the same time sequence as shown in FIG. 1A but are each maintained for essentially three times the time interval of the output shown in FIG. 1A. The operation of the entire ring circuit in producing outputs of this type may be understood from a consideration of stage 38A. When the ring circuit is programmed in accordance with Table III, the gates of cryotrons P32_e_ and P32_f_ are superconductive and the gates of cryotrons P34_c_, P34_d_, P36_a_, P36_b_ and P38_g_ are resistive. The current in path 38_b_ of stage 38A, therefore, is directed through the gate of cryotron P32_e_ to and through the coil of cryotron K32_g_, and thence back through the superconductive gate of cryotron P32_f_. Thus, stage 32A is reset to its Off condition when stage 38A, the sixth succeeding stage in the ring, is turned On. Similar connections are provided to reset each of the first six stages of the register so that, when the ring circuit is programmed in accordance with Table III and a start pulse is applied, the stages are successively turned On in sequence, with each stage controlling the turning On of the next succeeding stage in the ring, and each of the first six stages is subsequently turned Off when the sixth stage succeeding it in the ring is turned On.

The ring circuit of FIG. 3 may also be programmed so that there is no feedback connection from the succeeding stages to turn Off the preceding stages. This is accomplished by energizing the control conductor for all of the program control cryotrons with the exception of cryotrons P33_g_, P34_g_, P35_g_, P36_g_, P37_g_, P38_g_, P39_g_, P40_g_, P41_g_ and P42_g_. With only this group of program cryotrons superconductive, there is no superconductive feedback connection from succeeding to preceding stage available. Considering stage 38A for such a program, the current path 38_b_ is directed from the control coil of cryotron K38_f_ directly through the superconductive gate of cryotron P38_g_ to the gate of cryotron K38_g_ so that, when stage 38A is turned On, none of the preceding stages are affected. Where it is desired to employ a program of this type, the ring circuit may be reset after the operation is complete by programming the circuit in accordance with Table III to thereby cause the first six stages to be reset to their Off states under control of the last six stages. When this is accomplished the ring circuit may be programmed in accordance with any of the programs described above or other programs, and a start pulse applied to initiate the production of the desired output signals.

It will, of course, be obvious to those skilled in the art that the principles of the present invention which are applied in the illustrative embodiment of FIG. 3 to provide a programmable ring circuit, may be applied equally as well in designing circuits of this and other functional types wherein variation of the shape, duration, spacing, etc., of the outputs may be controlled by controlling program circuitry for that particular circuit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A superconductor commutator ring including; a plurality of bistable superconductor circuits; current supply means connected to said bistable circuits for continuously supplying current thereto; each of said plurality of bistable circuits including first and second parallel superconductor current paths and each being capable of assuming an Off stable state wherein the current from the said connected current supply means is in said first path and an On stable state wherein the current from said connected current supply means is in said second path; each of said paths of each of said bistable circuits being maintained at a superconductive temperature and each being entirely superconductive when the bistable circuit is in either said On or said Off state; each of said plurality of bistable circuits having first and second superconductor gate conductors respectively connected in series in the first and second paths thereof and first and second control conductors series connected in the second path thereof; whereby when any one of said bistable circuits is in its Off state the current from the connected current supply means is in said first gate conductor which is series connected in the first current path for the bistable circuit, and when any one of said bistable circuits is in its On state the current from the connected current supply means is in said second gate conductor and said first and second control conductors which are series connected in the second current path of the bistable circuit; said first control conductor connected in the second path of each of said plurality of bistable circuits being arranged in magnetic field applying relationship to the first gate conductor of a particular one of said plurality of bistable circuits succeeding it in said ring; the said second control conductor connected in the second path of each of said plurality of bistable circuits being arranged in magnetic field applying relationship to the second gate conductor of a particular one of said plurality of bistable circuits preceding it in said ring circuit; whereby, when any one of said bistable circuits is set to its On state, it is itself effective through the current in the first control conductor series connected in the second path thereof to turn On a particular succeeding bistable circuit in said ring and through the current in the second control conductor series connected in the second path thereof to turn Off a particular preceding bistable circuit in said ring; and output means connected in one of the paths of each of said ring circuits.

2. A superconductor commutator ring including; a plurality of successive bistable superconductor circuits; current supply means connected to said bistable circuits for continuously supplying current thereto; each of said plurality of bistable circuits including first and second parallel superconductor current paths and each being capable of assuming an Off stable state wherein the current from the said connected current supply means is in said first path and an On stable state wherein the current from said connected current supply means is in said second path; each of said paths of said bistable circuits being maintained at a superconductive temperature; each of said plurality of bistable circuits having first and second superconductor gate conductors respectively connected in series in the first and second paths thereof and first and second control conductors series connected in the second path thereof; whereby, when any one of said bistable circuits is in its Off state the current from the connected current supply means is in said first gate conductor which is series connected in the first current path for the bistable circuit, and when any one of said bistable circuits is in its On state the current from the connected current supply means is in said second gate conductor and said first and second control conductors which are series connected in the second current path of the bistable circuit; the first said control conductor connected in the second path of each of said plurality of bistable circuits being arranged in magnetic field applying relationship to the first gate conductor connected in the first current path of the next succeeding one of said bistable circuits in said ring; whereby, when one of said plurality of bistable circuits is switched from its Off to its On state, it switches the next succeeding bistable circuit in said ring from its Off to its On state and likewise each bistable circuit in said ring is successively switched from its Off to its On state by the preceding bistable circuit and, in turn, switches the succeeding bistable circuit from its Off to its On state; the second control conductor connected in the second path of each of said plurality of bistable circuits being arranged in magnetic field applying relationship to the second gate conductor connected in the second current path of the second preceding bistable circuit in said ring; whereby as each of said bistable circuits in said ring circuit is turned On by the immediately preceding stage it, in turn, turns Off the second preceding bistable circuit in said ring; and output means connected in one of the paths of each of said ring circuits.

3. A superconductor commutator ring for producing a series of sequential outputs in response to the application of a start signal; said ring including a plurality of superconductor bistable stages connected to current supply means for said ring; each of said stages including first and second parallel superconductor current paths; each of said stages having first and second superconductor gate conductors connected respectively in the first and second paths thereof; each of said stages being capable of assuming an On stable state in which the current from said current supply means flows in said first path and in said first superconductor gate conductor connected therein and an Off stable state in which the current from said current supply means flows in said second path and in said second superconductor gate conductor connected therein; each of said paths including said gate conductors being maintained at a superconductive temperature; a plurality of first control conductors one for each stage arranged in magnetic field applying relationship to the first gate conductor of the stage and effective when energized to drive that gate conductor resistive and switch the stage from its Off to its On state; a plurality of second control conductors one for each stage arranged in magnetic field applying relationship to the second gate conductor of the stage and effective when energized to drive that gate conductor resistive and switch the stage from its On to its Off state; means for applying a start pulse to the first control conductor for the first stage of the ring commutator to switch the first stage from its Off to its On state; the first control conductor of each of the successive stages being connected in the second superconductor path of the preceding stage in the ring whereby when said first stage is turned On by said start pulse it, in turn, turns On the next succeeding stage and likewise each stage in succession turns On the succeeding stage; the second control conductor for each of the successive stages being connected in the second path of the second stage succeeding it in the ring whereby each stage when it is turned On, in turn, turns Off the second preceding stage in said ring; and output means for each of said stages for manifesting a plurality of sequential outputs when a start pulse is applied to said first control conductor for said first stage.

4. A superconductor commutator ring for producing a series of sequential outputs in response to the application of a start signal; said ring including a plurality of superconductor bistable stages connected to current supply means for said ring; each of said stages including first and second parallel superconductor current paths; each of said stages having first and second superconductor gate conductors connected respectively in the first and second paths thereof; each of said stages being capable of assuming an On stable state in which the current from said current supply means flows in said first path and in said first superconductor gate conductor connected therein and an Off stable state in which the current from said current supply means flows in said second path and in said second superconductor gate conductor connected therein; each of said paths including said gate conductors being maintained at a superconductive temperature; a plurality of first control conductors one for each stage arranged in magnetic field applying relationship to the first gate conductor of the stage and effective when energized to drive that gate conductor resistive and switch the stage from its Off to its On state; a plurality of second control conductors one for each stage arranged in magnetic field applying relationship to the second gate conductor of the stage and effective when energized to drive that gate conductor resistive and switch the stage from its On to its Off state; means for applying a start pulse to the first control conductor for the first stage of the ring commutator to switch the first stage from its Off to its On state; the first control conductor of the successive stages being connected in the second superconductor path of the preceding stage in the ring whereby when said first stage is turned On by said start pulse it, in turn, turns On the next succeeding stage and likewise each stage in succession turns On the succeeding stage; programmable means coupling the second control conductor for each of a group of said stages to each of a plurality of stages succeeding it in said ring; output means connected in the second path of each of said group of stages for producing a series of outputs when a start pulse is applied to said circuit; and means for programming said coupling means for rendering the second control conductor for each of said group of stages responsive to be turned Off when a particular one of the succeeding stages to which it is coupled by said programming means is turned On and thereby controlling the duration of the outputs produced by said output means.

5. A superconductor commutator ring for producing a series of sequential outputs in response to the application of a start signal; said ring including a plurality of bistable superconductor stages each maintained at a superconductive temperature and each capable of assuming an On stable state and an Off stable state; each of said stages including first control means effective when energized to turn the stage On and second control means effective when energized to turn the stage Off; means coupling each of the stages to the first control means for a particular one of the stages succeeding it in said ring to render it effective when it is turned On to turn said succeeding stage On; output means for each of a group of said stages for producing outputs the stages are successively turned On; programmable coupling means connecting the second control means for each of said group of stages to a plurality of stages succeeding it in the ring; and means for programming said coupling means for rendering each of said group of stages selectively responsive to be turned Off when particular one of the succeeding stages to which it is coupled by said coupling means is turned On and thereby controlling the outputs produced by said output means.

6. A superconductor commutator ring comprising a plurality of superconductor bistable storage devices maintained at a superconductive temperature; each of said devices being capable of assuming an On state and an Off state; each of said bistable devices including means arranged in magnetic field applying relationship to a succeeding one of said bistable storage devices in said ring for rendering each of said bistable storage devices effective when switched from its Off to its On state to switch a succeeding one of the bistable devices in the ring from its Off to its On stage; means coupling each of a group of said bistable storage devices to a plurality of the bistable storage devices preceding it in said ring; means for programming said coupling means for rendering each of said group of bistable storage devices selectively effective when switched from its Off to its On state to switch a particular one only of the preceding storage devices to which it is coupled by said coupling means from its On to its Off state; and output means for said storage devices for producing outputs for said ring in accordance with the programming of said coupling means.

7. A superconductor circuit comprising: a plurality of superconductor stages each maintained at a superconductive temperature and each capable of assuming first and second stable states; programmable superconductor means maintained at a superconductive temperature connecting said stages with each of a group of said stages being connected to a number of the other ones of said stages; and means for programming said connecting means to render each of said group of stages responsive to be switched from one of its stable states to the other of its stable states under the control of any selected one of the number of the other ones of said stages to which it is connected by the programmable means and to be non-responsive to be switched from said one to said other stable state under the control of the remainder of said other ones of said stages.

8. A superconductor circuit comprising: a plurality of superconductor stages each maintained at a superconductive temperature and each capable of assuming first and second stable states; programmable superconducting means maintained at a superconductive temperature coupling said stages for rendering each of a group of said stages responsive to be selectively switched from one of its stable states to the other of its stable states under the control of any particular one of a number of the others of said stages; said programmable means comprising a plurality of groups of parallel superconductor paths each coupling one of said groups of stages to a number of the other stages, and means for selectively introducing resistance into said parallel superconductor paths coupling said stages.

9. A superconductor circuit comprising: a plurality of superconductor stages each maintained at a superconductive temperature and each capable of assuming first and second stable states; a plurality of first control conductor means one for each of a group of said stages effective when energized to control the stage to assume one of its first and second stable states; superconductor programmable means maintained at a superconductive temperature coupling the first control conductor means for each of said groups of stages to a number of the others of said stages; and means for controlling said programmable coupling means for rendering each of said stages in said group selectively responsive to assume one of its stable states under the control of different ones of the number of the others of said stages to which it is coupled by said programmable means and non-responsive to assume said one stable state under control of different ones of the number of others of said stages to which it is coupled by said programmable means.

10. In a superconductor circuit: a plurality of superconductor stages maintained at a superconductive temperature and each capable of assuming first and second stable states; current supply means connected to said superconductor stages for supplying current thereto; each of said stages including a first superconductor current path in which the current from said current supply means flows when the stage is in said first stable state and a second superconductor current path which is connected in parallel with the first path and in which current from said current supply means flows when the stage is in its second stable state; first, second and third superconductor gate conductors connected in the second path of first, second and third ones of said stages, respectively; first, second and third control conductors each arranged in magnetic field applying relationship to a corresponding one of said first, second and third gate conductors and each effective when energized to drive the corresponding gate conductor resistive to thereby cause the stage in which the gate conductor is connected to assume its first stable state; said first, second and third control conductors being respectively connected in first, second and third superconductor parallel branches of the second superconductor current path of a fourth one of said stages; and means for selectively introducing resistance into any two of said first, second and third branches to thereby render any particular one only of said first, second and third stages responsive to assume its first stable state when the fourth stage is caused to assume its second stable state.

11. In a superconductor circuit: a plurality of superconductor stages each maintained at a superconductive temperature and each capable of assuming first and second stable states; current supply means connected to said superconductor stages for supplying current thereto; each of said stages including a first superconductor current path in which the current from said current supply means flows when the stage is in said first stable state and a second superconductor current path which is connected in parallel with the first path and in which current from said current supply means flows when the stage is in its second stable state; first, second and third superconductor gate conductors connected in the second path of first, second and third ones of said stages, respectively; first, second and third control conductors each arranged in magnetic field applying relationship to a corresponding one of said first, second and third gate conductors and each effective when energized to drive the corresponding gate conductor resistive to thereby cause the stage in which the gate conductor is connected to assume its first stable state; said first and second control conductors being respectively connected in first and second parallel branches of the second superconductor path of a fourth one of said stages; said second and third control conductors being respectively connected in third and fourth parallel branches of the second superconductor path of a fifth one of said stages; and means for selectively introducing resistance into said first, second, third and fourth parallel branches.

12. In a superconductor circuit; a plurality of superconductor stages each maintained at a superconductive temperature and each capable of assuming first and second stable states; current supply means connected to said superconductor stages for supplying current thereto; each of said stages including a first superconductor current path in which the current from said current supply means flows when the stage is in said first stable state and a second superconductor current path which is connected in parallel with the first path and in which current from said current supply means flows when the stage is in its second stable state; a first superconductor gate conductor connected in one of said current paths of a first one of said stages; a second superconductor gate conductor connected in one of said current paths of a second one of said stages; first and second control conductors each for controlling a corresponding one of said first and second gate conductors to assume a resistive state and thereby cause the stage in which that gate conductor is connected to assume a particular one of said first and second stable states; one of the superconductor current paths of a third one of said stages including first and second parallel superconductor branches; said first and second control conductors being connected in said first and second branches, respectively; means for switching said third stage between its stable states; and further control conductor means for selectively introducing resistance into said first and second branches of said one of the paths of said third stage for selectively controlling said first and second stages to be responsive to said switching of said third stage.

13. In a superconductor circuit: a plurality of superconductor stages each maintained at a superconductive temperature and each capable of assuming first and second stable states; current supply means connected to said superconductor stages for supplying current thereto; each of said stages including a first superconductor current path in which the current from said current supply means flows when the stage is in said first stable state and a second superconductor current path which is connected in parallel with the first path and in which current from said current supply means flows when the stage is in its second stable state; a plurality of superconductor gate conductor means one for each of said stages connected in one of the paths of the stage; a plurality of control conductor means one for each of said stages for controlling the said gate conductor means thereof to assume a resistive state and thereby controlling the stage to assume a particular one of said first and second stable states; one of the superconductive paths of each of first and second ones of said stages including a plurality of parallel branches; each of the control conductor means in a first group of said control conductor means being connected in a different one of the parallel branches of said first one of said stages; each of the control conductor means in a second group of said control conductor means being connected in a different one of the parallel branches of said second one of said stages; and further control conductor means for selectively introducing resistance into said parallel branches of said first and second stages and thereby selectively rendering said first and second stages effective to control others of said stages.

14. A superconductor circuit comprising: a plurality of superconductor stages each maintained at a superconductive temperature; programmable superconductor means connecting said stages; each of a group of said stages being connected to a number of the other of said stages; and means for programming said connecting means to render each of said group of stages selectively responsive or non-responsive to control by selected ones of the number of the other ones of said stages to which it is connected by said programmable means.

15. The circuit of claim 14 wherein each of said stages includes first and second superconductive paths connected in parallel circuit relationship with respect to a current input terminal for the stage; said circuit includes a current source connected in series with each of said stages; and said programming means includes a plurality of superconductive gate conductors connected in parallel circuit relationship in different ones of said paths of said stages and a plurality of control conductors for controlling the stage, superconductive or resistive, of said gate conductor.

References Cited in the file of this patent

UNITED STATES PATENTS 2,832,897 Buck ---------------- Apr. 29, 1958